June 5, 1923.

P. F. LOICHOT

ELECTRIC POWER MECHANISM

Filed May 11, 1922   3 Sheets-Sheet 1

1,457,910

INVENTOR
Paul F. Loichot,
By Bates & Macklin,
ATTORNEYS

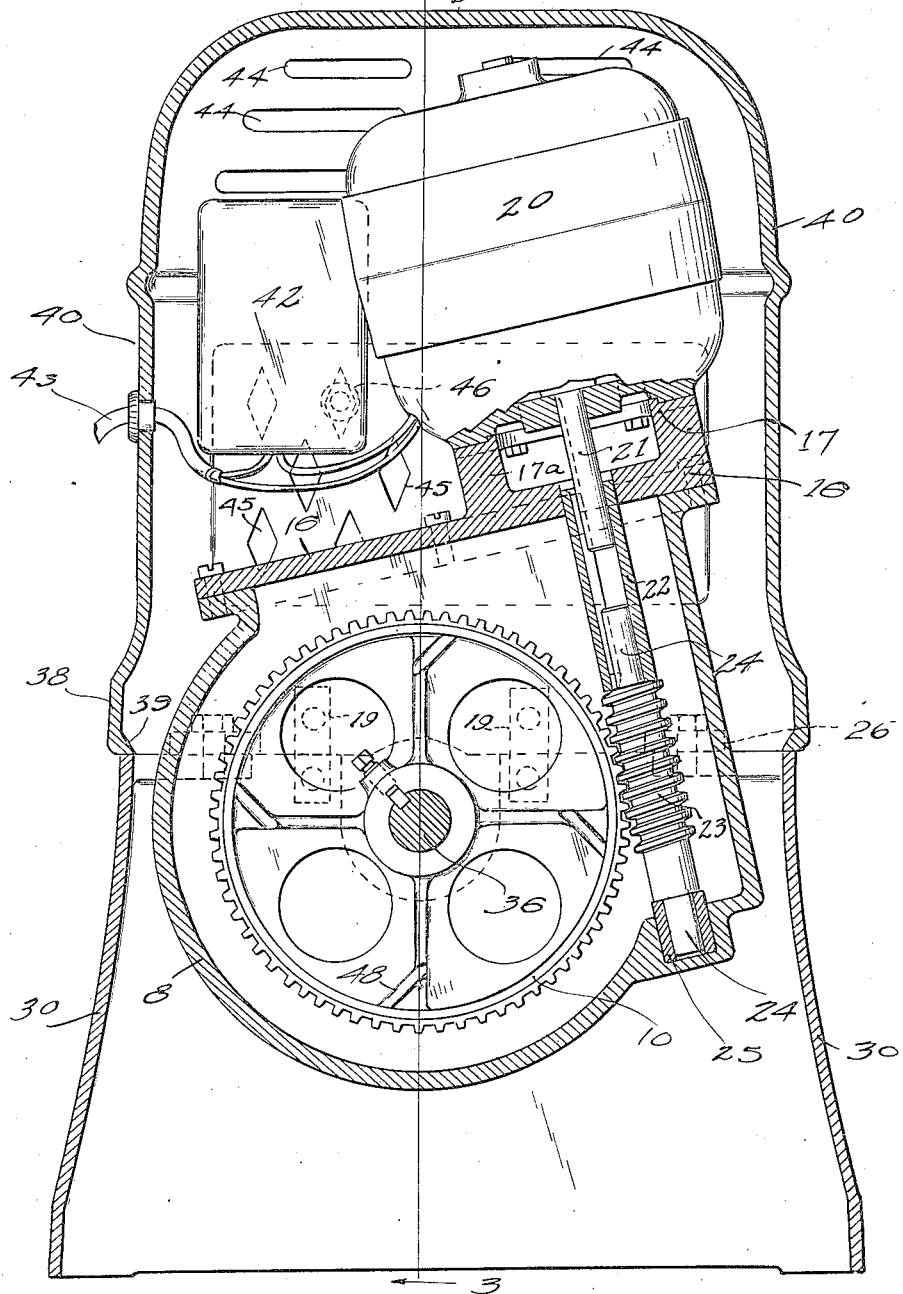

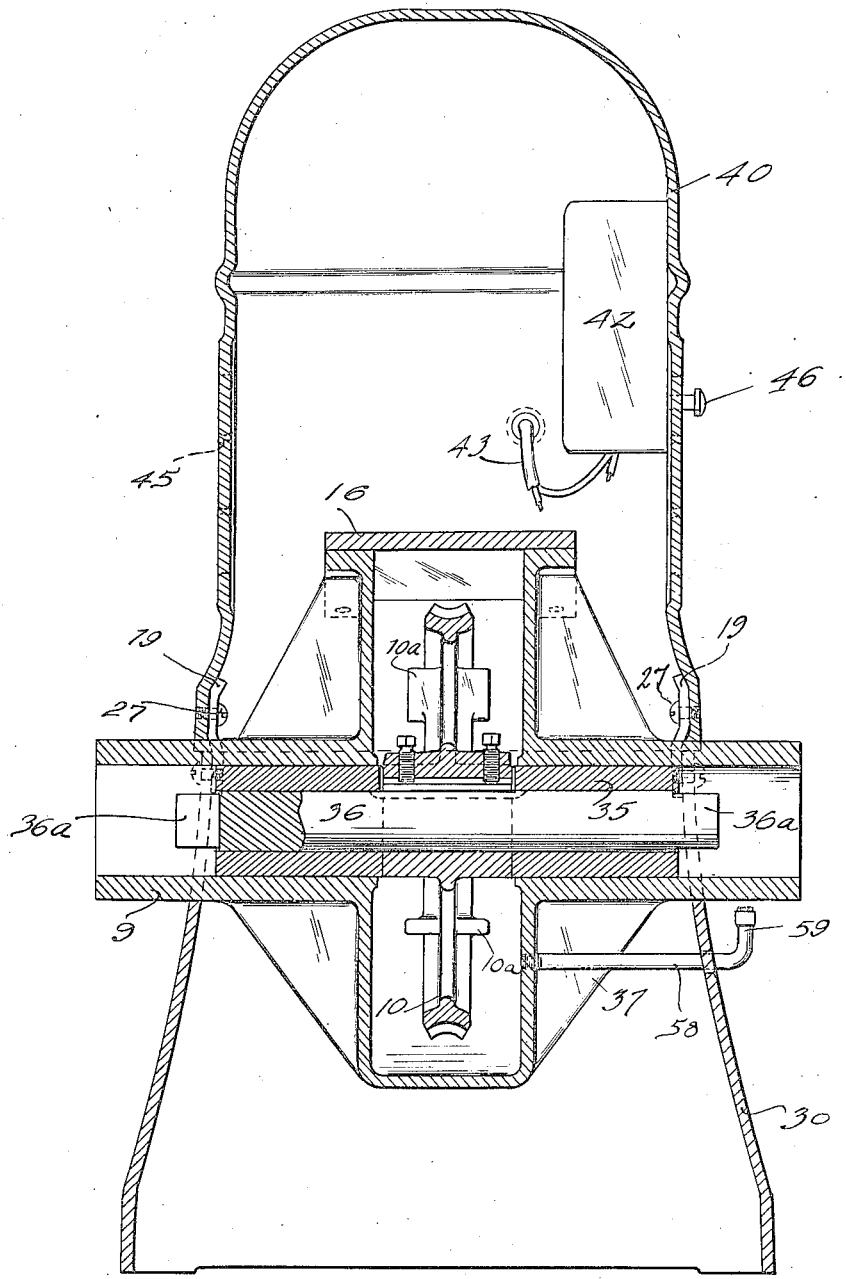

Patented June 5, 1923.

1,457,910

UNITED STATES PATENT OFFICE.

PAUL F. LOICHOT, OF LOUISVILLE, OHIO.

ELECTRIC POWER MECHANISM.

Application filed May 11, 1922. Serial No. 560,080.

*To all whom it may concern:*

Be it known that I, PAUL F. LOICHOT, a citizen of the United States, residing at Louisville, in the county of Stark and State of Ohio, have invented a certain new and useful Improvement in an Electric Power Mechanism, of which the following is a full, clear, and exact description, reference being had to the accompanying drawings.

This invention relates to electric power mechanisms suitable for driving domestic appliances and commercial devices such as are used in retail stores.

The general object of the invention is the provision of a power device having the characteristic of commercial adaptability in driving various detachable mechanisms such as are used by retail merchants; the unit being compact and symmetrical in appearance and proportioned to have a low center of gravity while being of sufficient height to permit the ready attachment of various mechanisms to be driven, such as coffee grinders, meat choppers and the like.

A further object of the invention is to provide a compact power unit having an electric motor and reduction gearing therefor suitably supported by a rugged inner housing which serves as an oil casing and supports a worm gear drive, the motor and gear casing being supported by and suspended within an outer symmetrical housing through the sides of which means may extend from the inner housing member to support and drive the various mechanical attachments referred to.

More specifically, the invention is concerned with novel improvements made in the construction of a similar device patented to M. H. Spielman, May 31, 1921, Patent No. 1,380,162, the present device embodying a more compact and rugged power unit having a construction wherein a less number of parts are used, which are more simple in character and which fulfill the respective purposes thereof in a more efficient manner. The universal characteristic of the utility of the device has been retained in furthering this end.

Other objects will be hereinafter set forth in the following description given in connection with the accompanying drawings. The essential features will be summarized in the claims.

Figure 1:
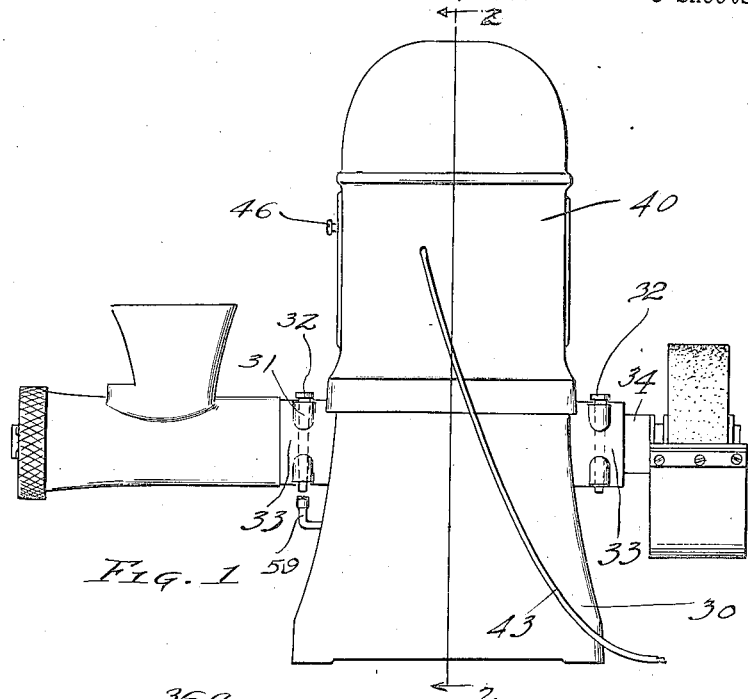
Figure 4:
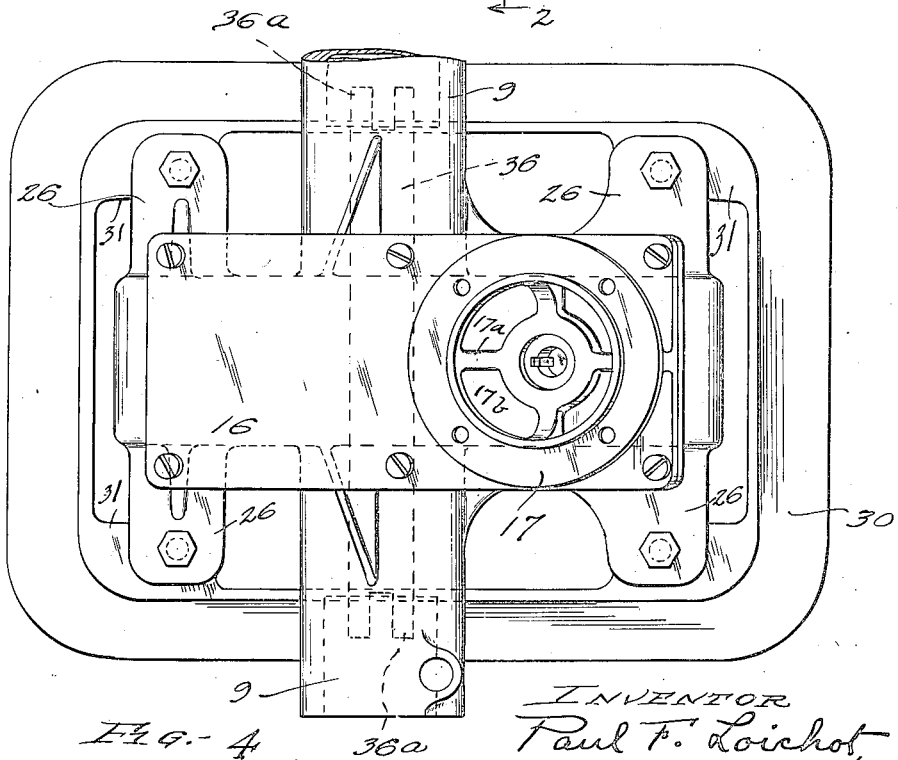

In the drawings, Fig. 1 is an elevation of the device and attached mechanisms which are driven thereby; Fig. 2 is a cross sectional elevation taken substantially along the line 2—2 of Fig. 1; Fig. 3 is a cross sectional elevation taken along the line 3—3 of Fig. 2; Fig. 4 is a plan view with the top member of the outer housing and motor removed and illustrating the manner of supporting the power unit on an outer base member.

In carrying out the objects of my invention, I have arranged a motor 20 on a reduction gear housing 8 formed in the nature of a leak-proof oil casing and suspended within an outer symmetrical housing comprising a base member 30 and an upper member 40 resting thereon. This gear casing may have an opening formed in the top thereof of sufficient size to permit the insertion of a large worm gear 10, the opening being surrounded by a suitable flange having a machine-finished surface which may be substantially at right angles to a radial line taken from the center of integral hub portions 9. The hub portions 9 extend laterally a sufficient distance to project through the side walls of the outer housing and constitute a support for bearing members and driven devices detachably secured to the power unit in a manner to be presently described.

The casing may be provided with integral lugs 26 formed on the opposite sides thereof which extend a sufficient distance from the casing to engage inwardly extending lugs 31 formed at the four corners of the base member. The upper opening in the casing may be closed by a cover member 16, which is provided with an annular pedestal 17 formed integral therewith and which constitutes a base or rest whereby the motor 20 may be supported thereon with its shaft in a position slightly inclined to the vertical. The pedestal 17 may be in the form of a flanged ring spaced from the cover member by integral lugs 17ª, thus providing passageways 17ᵇ through which air may be drawn by the motor fan.

The motor shaft 21 may be of sufficient length to extend downwardly through an opening in the cover member 16 when positioned on the pedestal 17. A worm 23 is arranged to engage the worm gear 10 and is mounted on a shaft member 24 suspended within the casing. The upper end of the worm shaft is coupled to the motor shaft by a sleeve 22 bearing on the cover 16, while the lower end is supported by a suitable bearing sleeve 25 mounted in a bore formed interiorly of the casing. As shown in Fig. 2 the bore does not extend completely through the wall of the casing as it is desirable to fill the casing to the height of the worm gear bearings with lubricant.

It will be noted that the power unit proper, namely, the reduction gearing casing and motor are supported on the outer base member 30, the latter member being of sufficient width and length to insure proper stabilization of the power unit in case the device is unduly loaded on one side by attaching, for instance, a meat chopper.

The base member 30 may have an upper plane surface which includes the upper surface of the inwardly extending lugs 31, whereby but one machining operation is required to condition the base member for assembling.

The gear casing 8, as hereinbefore stated, may have suitably formed lugs 26 extending from the side walls of the casing a sufficient distance to rest upon the inwardly extending lugs 31 of the base member 30, but are arranged to terminate short of the outer perimeter of the base member for the purpose of providing clearance between the lugs and the upper housing member 40. Connecting members 19 may be secured to the upper and lower housing members 40 and 30 respectively in any suitable manner such as by the use of screw members 27.

Any suitable means for filling the gear casing with lubricant may extend from the casing to the exterior of the housing such as a tube member 58 communicating with the case and an upright tube 59 disposed externally of the housing. The tube 59 may extend upwardly a sufficient distance to determine the maximum lubricant level adjacent the lower portion of bearing members 35. Lubricant distributing portions (10ª) formed on the worm gear 10 serve to elevate the lubricant to the worm shaft bearings and bearings 35.

As shown in Fig. 3, the hub portions 9 extending through the side walls of the base member 30, are provided with suitable bosses 55 formed near the outer ends of the hubs and to one side of the hub center. Tapered pin members 32 pass through suitably bored openings formed in these hub portions, whereby the hubs constitute supporting means engaging non-rotatable sleeves 34 which are common to the various attachments used in combination with the power device and the tapered pins engage the sleeves and prevent rotation thereof. The bore of the hub is of sufficient size to receive substantial bearing members 35 in which the worm gear shaft 36 is rotatably mounted, the bearing members however, being of considerably less length than the length of the hubs to provide sufficient space for the reception of the sleeves hereinbefore referred to. Slotted ends 36ª of the shaft may extend into the space a substantial distance whereby the shafts of the various driven devices may be readily coupled thereto.

To further insure the rigidity of the casing member 8 and integral hubs 9, rib members 37 are formed on the casing member which serve to strengthen the walls of the casing as well as to maintain alignment of the hub portions after they are bored.

To obtain a symmetrical outer appearance I have provided a bottom flange 38 on the upper housing member 40 which may have an inward extension 39 resting upon the upper plane surface of the base member 30, there being sufficient space between the lugs 36 of the gear housing and the upper housing members to permit engagement of the portion 39 completely around the perimeter of the base member.

The upper member 40 may have the side walls thereof formed somewhat in the manner of a grating, to provide openings 45 for the circulation of air about the motor, while the top portion of this member may have a symmetrical dome shape with suitable elongated openings 44 formed therein, to further insure the circulation of cooling air currents about the motor.

A switch box 42 containing a suitable control switch may be disposed interiorly of the upper housing member and be secured to one of the grated walls thereof, whereby a control lever 46 may extend from the box through one of the openings 44. A current conducting cord 43 may pass through an opening formed in the end wall of the housing and the lead wires from the switch box to the motor may be of sufficient length to permit removal of the upper housing member from the device without injuring the wire connections to the motor.

From the foregoing description it is to be seen that a compact motor unit with a reduction worm drive of unusual power is provided wherein the worm and gear are efficiently housed in an oil casing which likewise serves as a support for various mechanisms driven by the motor. The casing member is of a very simple but rugged de-design having side hubs in which the worm gear shaft can be interchangeably connected to various driven devices. The power unit is suspended within the outer housing in such a manner that the center of gravity of the entire device is comparatively close to the bottom of the base, thus insuring stability when the power unit is eccentrically loaded.

Furthermore, the power unit proper may be completely assembled independent of the outer frame, after which it may be conveniently positioned in the outer frame in the manner described, there being practically no further adjusting or finishing required in the assembling of either the power unit, the base member or the upper housing member. The completed structure presents a neat symmetrical appearance occupying a minimum space on the counter, bench, or pedestal in the store or shop.

Further, the power unit is suspended within the outer frame as near the bottom thereof as is practical, there being only sufficient distance between the center line of the worm shaft and the bottom of the base to provide clearance for a grinding wheel or to provide space for a receptacle to receive meat or other food stuffs being cut by a food chopper.

Having thus described my invention, I claim:—

1. In a power device, an outer housing comprising a base member and a top member, an inner housing having a power shaft horizontally suspended in the housing, a motor supported on the housing and connected to said shaft for driving the same, the housing having integrally formed hubs extending therefrom through the side walls of the outer housing, and bearing members positioned within the hub portions for supporting said shaft, said hubs being adapted to receive engaging sleeves of devices driven by said power unit.

2. In a power device, an outer housing comprising a base member and a dome member, an inner gear housing, a power shaft horizontally arranged in said last named housing, a motor mounted on said inner housing and geared to said shaft, said inner housing having laterally formed bearing hubs extending through the side walls of the outer housing, and bearing members positioned within the hub portions for rotatably supporting said shaft, the bearing members being of less length than the length of the hub portions whereby detachable driven devices having sleeves may be connected to the hub portions of said inner housing member.

3. A power plant having an electric motor and an inner and an outer housing, said outer housing comprising a base member and a top member and the inner housing comprising a closed casing adaptable for the suspension of a worm and worm gear reduction drive and having a closing member adapted to support the electric motor with the shaft thereof in alignment with the worm.

4. In a power device, an outer housing comprising a base member and an upper member, an inner housing comprising an oil-tight gear casing, reduction gearing suspended within the casing, said casing having a closing member with an annular motor base formed thereon, a motor mounted on the closing member with the axis thereof inclined to the vertical, said gear casing being suspended within the base member and said motor being supported by the casing within the upper housing member.

5. In a power device, an outer housing comprising a base member and an upper housing member mounted thereon, a gear housing mounted on the base independently of said upper housing member, a transversely extending power shaft rotatably supported by the gear housing and integrally formed hubs extending through the side walls of the outer housing, an electric motor supported by the gear housing and reduction gearing associated with the shaft of the motor and the power shaft, whereby various devices may be attached to said hub portions and be driven by said power shaft.

6. In a power device, an outer housing comprising a base member and a top member, a motor support and gearing housing suspended within said outer housing, a power shaft horizontally arranged in said last named housing, a motor shaft for driving the same, bearing members positioned within hub portions of the gear housing for rotatably supporting said shaft, whereby the bearings may be constantly lubricated by filling the inner housing with lubricant.

7. In a power device, an outer housing comprised of a base member and a top member, a power unit comprising a power shaft, a motor and reduction gear mechanism associated with the power shaft and the motor shaft, an inner frame structure comprising a support for said motor and reduction gear mechanism, said structure including a closed casing for supporting the reduction gearing in a lubricant bath, and an upper portion constituting a motor support, the entire inner structure being suspended within the outer housing and supported by the base member thereof.

8. In a power device of the class described, an outer frame structure comprising a base member and a removable top member, an inner structure supported by the base member and comprising a support for the power delivering mechanism, said inner structure being in the nature of a gear casing and motor support and having laterally extending hub portions projecting through the side walls of the base member, a power shaft driven by a worm gear positioned within the casing and rotatably supported by bearing members positioned in the hub portions, said shaft having slotted ends projecting beyond the outer ends of the bearings and terminating short of the ends of the hub portions of the casing, whereby the outer ends of the hub portions may be adaptable for the supporting of various appliances to be driven by said shaft.

9. In a power device, an outer structure comprising a housing having a base member and a removable top member, and an inner structure secured to the base mechanism comprising a power shaft, a motor and reduction gear mechanism associated with the power shaft and the motor shaft, said motor and reduction gear mechanism being supported by the inner frame structure, the lower portion of the inner structure constituting a closed casing for supporting the reduction gearing in a lubricant bath and the upper portion thereof constituting an inclined motor base, whereby the motor may be disposed within said removable top member with the shaft thereof in an inclined position.

In testimony whereof, I hereunto affix my signature.

PAUL F. LOIC OT